United States Patent
Huang

(10) Patent No.: US 8,526,382 B2
(45) Date of Patent: *Sep. 3, 2013

(54) PLUG-AND-PLAY WIRELESS NETWORK EXTENSION STATION AND METHOD OF AUTOMATIC CONFIGURATION THEREOF

(75) Inventor: Wu-Sheng Huang, Taipei (TW)

(73) Assignees: Wu-Sheng Huang, Taipei (TW); Napuda Technology Co., Ltd., Taipei (TW)

( * ) Notice: Subject to any disclaimer, the term of this patent is extended or adjusted under 35 U.S.C. 154(b) by 252 days.

This patent is subject to a terminal disclaimer.

(21) Appl. No.: 13/092,011

(22) Filed: Apr. 21, 2011

(65) Prior Publication Data

US 2012/0044856 A1 Feb. 23, 2012

(30) Foreign Application Priority Data

Aug. 20, 2010 (TW) .............................. 99127999 A

(51) Int. Cl.
*H04W 4/00* (2009.01)
(52) U.S. Cl.
USPC ............................ 370/329; 370/338; 370/341
(58) Field of Classification Search
None
See application file for complete search history.

(56) References Cited

U.S. PATENT DOCUMENTS

| | | | |
|---|---|---|---|
| 2005/0047046 A1* | 3/2005 | Natarajan | 361/115 |
| 2006/0002331 A1* | 1/2006 | Bhagwat et al. | 370/328 |
| 2009/0019539 A1* | 1/2009 | Jonnalagadda et al. | 726/14 |
| 2009/0067441 A1* | 3/2009 | Ansari et al. | 370/401 |
| 2009/0119741 A1* | 5/2009 | Palnitkar et al. | 726/1 |
| 2009/0310546 A1* | 12/2009 | Gopinath et al. | 370/329 |
| 2010/0188279 A1* | 7/2010 | Shamilian et al. | 341/176 |

* cited by examiner

*Primary Examiner* — Chi Pham
*Assistant Examiner* — Soon-Dong D Hyun
(74) *Attorney, Agent, or Firm* — Li & Cai Intellectual Property (USA) Office

(57) ABSTRACT

Provided is a plug-and-play wireless network extension station and its automatic configuration process. This wireless network extension station particularly explores any wireless network extension controller over a power-line network through a power-line communication technology. The process includes broadcasting exploration packet, determining the controller's network address from a response, automatically receiving wireless network configuration and establishing a connection after self-configuration. In one embodiment, the wireless network extension station at least includes a data processing unit, a wireless-network module for providing a wireless network access service and a power-line network bridging module for data transmission using the power-line communication technology. A station exploration communication module is also provided for exploring the controller's network address via broadcast and receiving wireless network configuration. The automatic connection and network configuration achieves the plug-and-play network extension.

20 Claims, 8 Drawing Sheets

PLUG-AND-PLAY WIRELESS NETWORK EXTENSION STATION AND METHOD OF AUTOMATIC CONFIGURATION THEREOF

BACKGROUND OF THE INVENTION

1. Field of the Invention

The instant disclosure relates to a plug-and-play wireless network extension station and an automatic configuration method, more particularly, to the wireless network extension station capable of automatically network exploring and configuring.

2. Description of Related Art

One usual way to expand the coverage of a Wi-Fi network is to configure an Ethernet network for linking multiple wireless stations. The linking among the stations may provide broader network service since a larger coverage is covered.

According to the conventional technology, in order to establish a wireless area network covering a specific range, multiple wireless network stations are required and multiple related settings need to be configured. The configuration may include the setting related to the wired network such as ADSL, and the setting related to the wireless network such as the parameters of SSID, signal channel, network gateway, and security password. The wireless network configuration related to the station A is required to be configured as the device with wireless network connection receives the wireless signals from the nearby wireless network station A.

In order to expand the coverage of the wireless signals or increase number of connection channels, the number of wireless network stations over the Ethernet network is also increased. In the meanwhile, all the wireless network stations over the same network need the same wireless network configurations. For example, it is required to enter a setting page for each station for connection configuration, in which the wireless network configuration needs to be duplicated for the all stations. Therefore, the interconnected wireless network stations may cover a broader signaling range. More, a gateway may be adopted to link two or more network domains.

However, the mentioned configuration for each station needs to be modified entirely or constantly duplicated when the coverage of network expands, or any change occurs. The disadvantages of the conventional technology are summed up as follows:

The network administrator needs to implement the tangible routing of Ethernet network among the wireless network stations;

The network administrator needs to perform the same wireless network configuration and security parameters to the each wireless station manually;

It is easy to make mistake as manually performing the wireless network configuration and network security parameters;

The parameters of configuration are required to be modified manually when the wireless network configuration is changed;

The network administrator has no effective way to monitor the operational statuses of all the wireless stations.

Moreover, an aspect of known power-line network may be introduced to be data transmission channel among the wireless stations for reducing the cost resulting in Ethernet network construction. The power-line communication technology (PLC) may be used to expand the network coverage by installing a power-line network bridge in the network. The data may be carried over the power-source loop for transmission. Therefore the network devices may be communicated to each other over the power-line network.

The conventional method may still manually perform configuration to the wireless network stations over the power-line network for having the same wireless network configuration. However, this conventional method may have drawbacks such as:

1. The network administrator must manually set the same wireless network configuration and security parameters to every wireless network station;

2. Manually setting the wireless network configuration and security parameters may easily bring mistakes;

3. The configuration for each station requires manual modification as the wireless network configuration changes;

4. The network administrator has no way to monitor the operational statuses of all the stations.

SUMMARY OF THE INVENTION

In view of the difficulties for expanding wireless network coverage in the conventional art, disclosed in the invention is a wireless network extension station, which is coupled to a wireless Ethernet extension controller via network, and also a method of automatic configuration therefor. The scheme of automatic configuration implements a plug-and-play connection, which accomplishes an easier and more convenient way to configure the wireless network configuration.

In one aspect contemplated by the invention, the plug-and-play wireless network extension station mainly includes a data processing unit, a wireless network module for serving wireless access service, and a power-line network bridging module for data transmission using power-line communication technology. This bridging module is used to connect to the power-line network bridging module of the wireless Ethernet extension controller.

The wireless network extension station further includes a station exploring communication module used for exploring any in-progress wireless network extension controller by broadcasting packets using the power-line communication technology. The wireless Ethernet extension station then connects to the wireless Ethernet extension controller based on the explored network address.

After that, the wireless network extension station receives wireless network configuration from the wireless Ethernet extension controller, and accordingly initiates the wireless network configuration for automatic connection.

In another one aspect of the method of automatic configuration for the wireless network extension station, when the extension station connects to a power source, a power-line network is then established in compliance with power-line communication technology. A power-line network bridging module at station end is initiated. Based on the explored information, the network address of the wireless Ethernet extension controller is resolved. That is, a wireless Ethernet extension controller is in-progress over the power-line network.

In order to implement the plug-and-play function, the wireless network extension station may automatically receive the wireless network configuration as connecting to the in-progress wireless Ethernet extension controller. The wireless network configuration for the wireless network extension station is configured to implement the automatic connection.

In particular, a control panel of the wireless network extension station may include some light indicators, buttons or a toggle button. These indicators or buttons may be used to reconfigure the configuration, such as using a reset switch to request the wireless network configuration again. Further, a button may be used to shut down the wireless module for turning off the wireless communication function of the wireless network extension station. Further, some light indicators may be used to display the communication status of the power-line network. Still further, the light indicator indicates the status of connection to the wireless Ethernet extension controller. The light indicator may also indicate whether or not the wireless network configuration is received from the wireless Ethernet extension controller.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
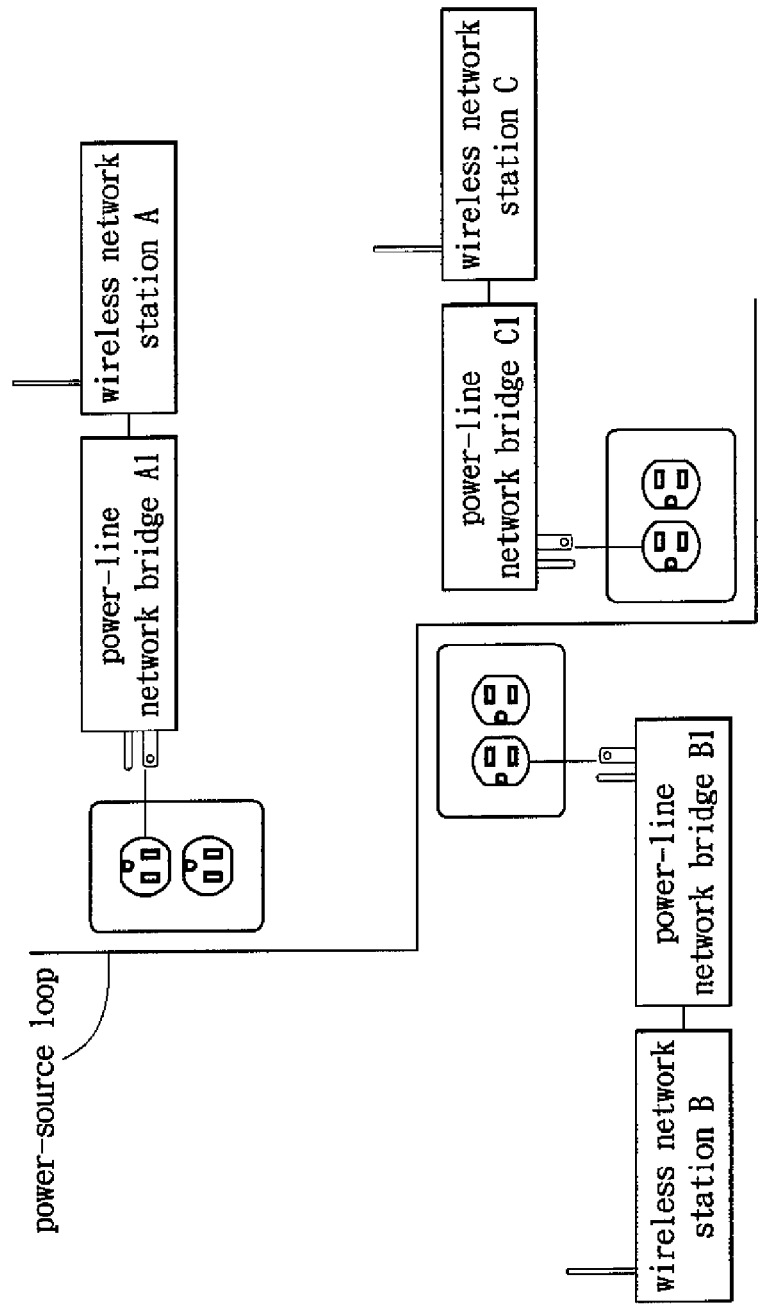
FIG. 1 shows a layout diagram of conventional wireless network stations interconnected using a power-line network bridge.
Figure 2:
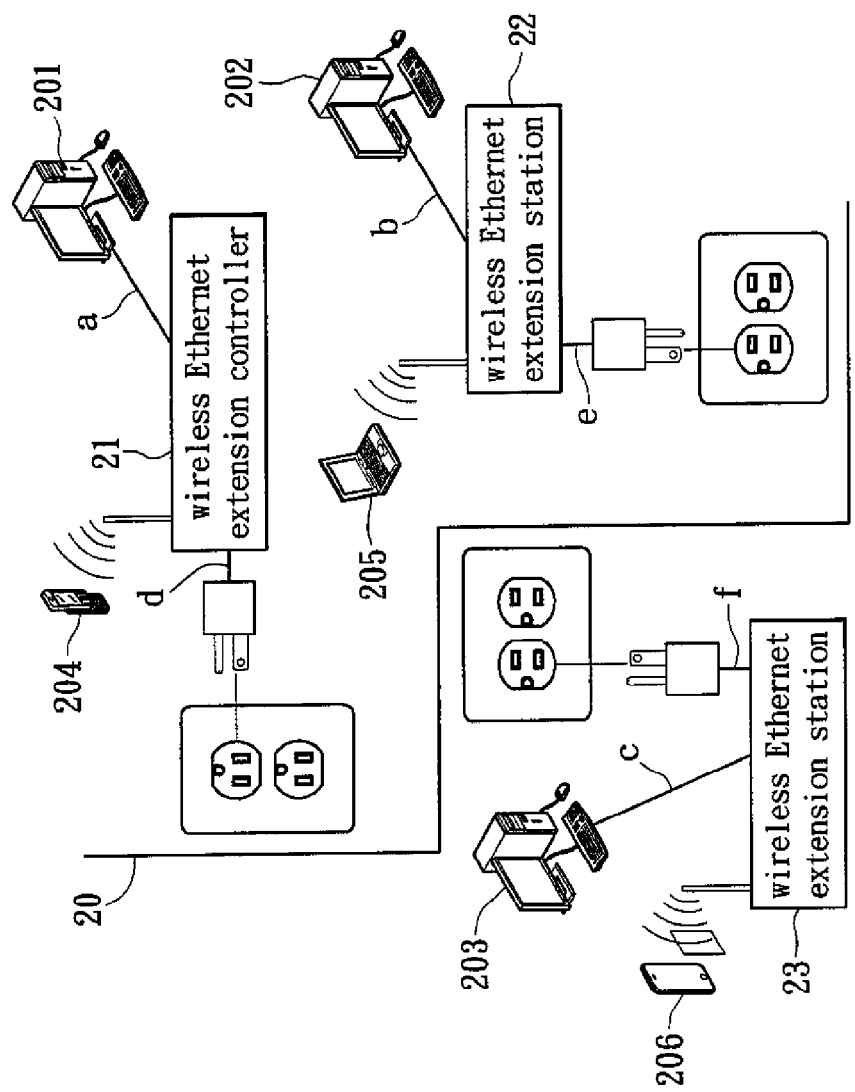
FIG. 2 shows a schematic diagram of a local area network in one embodiment in accordance with the instant disclosure.

Reference is made to FIG. 2, which shows a configuration of a local area network in accordance with the instant disclosure. In an exemplary example, one wireless Ethernet extension controller 21 and two wireless network extension stations 22, 23 are disposed at different positions over a power-source loop 20. For example, the wireless Ethernet extension controller and wireless network extension stations may be positioned at different rooms or floors at home (such as FIG. 3), or at the places of some company departments. The wireless Ethernet extension controller 21 and wireless network extension stations 22, 23 may connect to the terminal devices 201, 202, 203, 204, 205, 206 through the network lines a, b, c or wireless connection. These controllers 21 and stations 22, 23 are individually connected to a power source via the power lines d, e, f. Each device is equipped with the circuit related to the power-line network bridge; therefore it's able to process communication and data transmission using the power-line communication technology (PLC).

The shown network area ranges over the wireless signaling field of the wireless Ethernet extension controller 21 and its provided Ethernet network area. The area also ranges over the wireless signaling field of the wireless network extension stations 22, 23 and their own Ethernet network area over the lines a, b and c to some terminals. As well, the area also includes the field covered by the power line network.

All the above mentioned wireless Ethernet extension devices (21, 22, and 23) integrate the bridging function of power-line network bridge, and the devices may regard the power-source loop as a data transmission network. Therefore, the extension controller 21 may establish connection to the extension stations 22, 23 for data transmission over the same power-source loop 20.

The embodiment of FIG. 2 also shows the each device (21, 22, and 23) may itself integrate both wireless network and Ethernet network (wired) in addition to the support of power-line network connection. The integration of the wireless and wired connections along with the power-line network connection extends the access range of the wireless and wired networks. Since the whole network area is therefore expanded, the wireless or wired network workstations near the extension devices can conveniently share the network coverage provided by the wireless network and Ethernet network.

Figure 3:
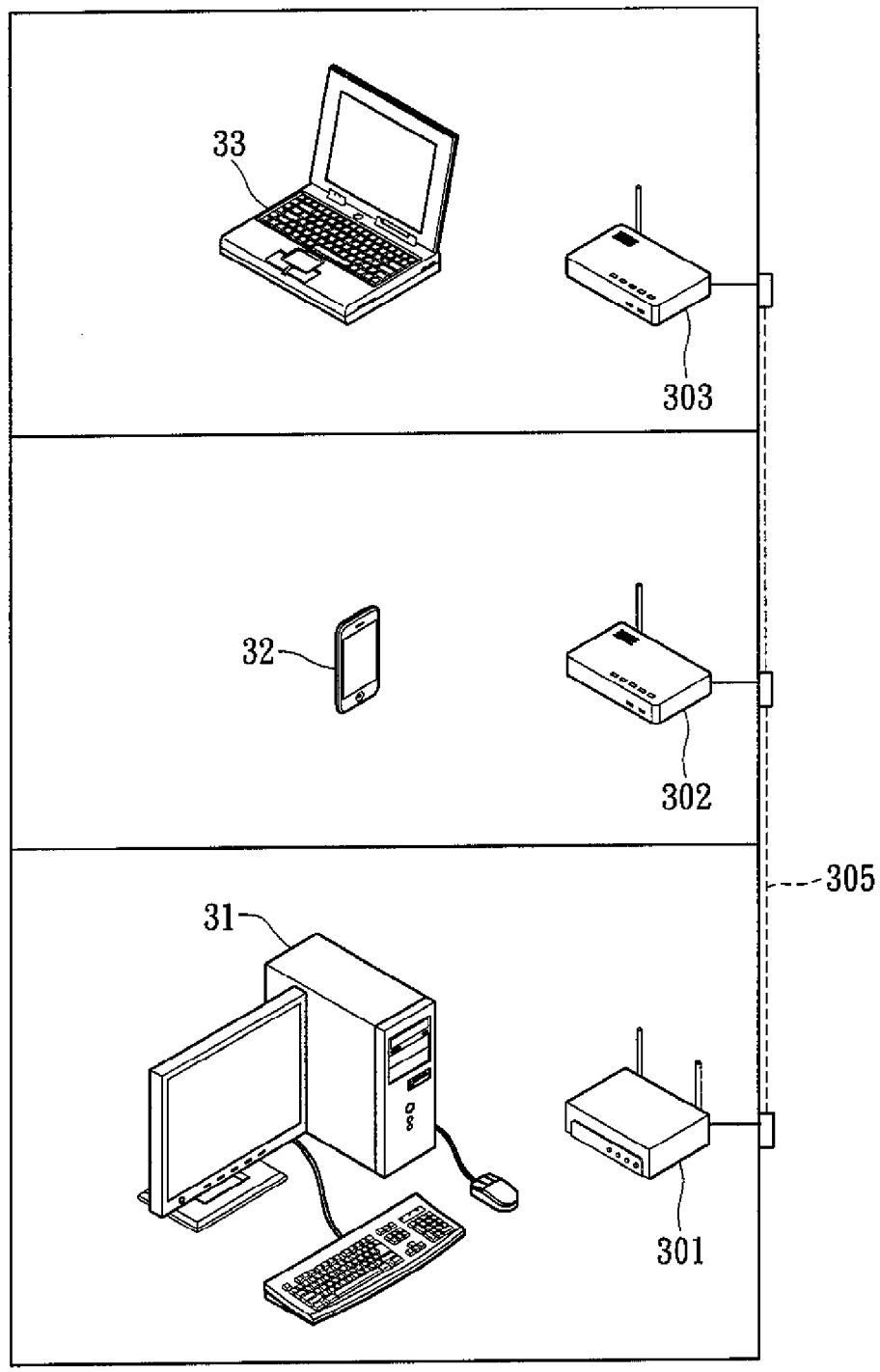
FIG. 3 shows a schematic diagram of a wireless network extension station of one embodiment in accordance with the instant disclosure.

Reference is made to FIG. 3. This figure shows a schematic diagram of the wireless network extension station in accordance with the invention in the application at different floors.

In the current example, the floors 30 includes a first floor disposed with a wireless Ethernet extension controller 301, and thereby connects to the wired Ethernet network using ADSL. This wireless Ethernet extension controller 301 provides the terminal device 31 within its coverage to link external network.

For providing the terminal device 32 at second floor to access network, in one embodiment, a wireless network extension station 302 is installed at this floor. Rather than the extension controller 301 at first floor, this station 302 may automatically provide the users at this second floor to access the external network since it's no need to perform the wireless configuration according to the invention. In the meanwhile, the wireless network extension station 302 may couple to the wireless Ethernet extension controller 301 at first floor over a wired network. Alternatively, while the wireless network extension station 302 connects to a power source over a power line 305, the wireless Ethernet extension controller 301 in the same power loop is also within the same power-line network.

In the same aspect, the wireless network extension station 303 at third floor may also provide the terminal device 33 to access external network when this station 303 is within the same power-line network with the above wireless Ethernet extension controller 301 and wireless network extension station 302 as connecting to the power source. In which, the connections among the wireless Ethernet extension controller 301 and the wireless network extension stations 302, 303 may be implemented by a wired Ethernet network.

In particular, the aspect according to FIG. 3 shows an automatic exploring process over the power-line network is performed for acquiring the controller's network address, and the wireless network configuration is automatically received and configured by the stations. Therefore, merely the wireless Ethernet extension controller 301 at first floor needs to configure its wireless network configuration in advance, and the other wireless network extension stations 302, 303 are plug-and-play.

Figure 4:
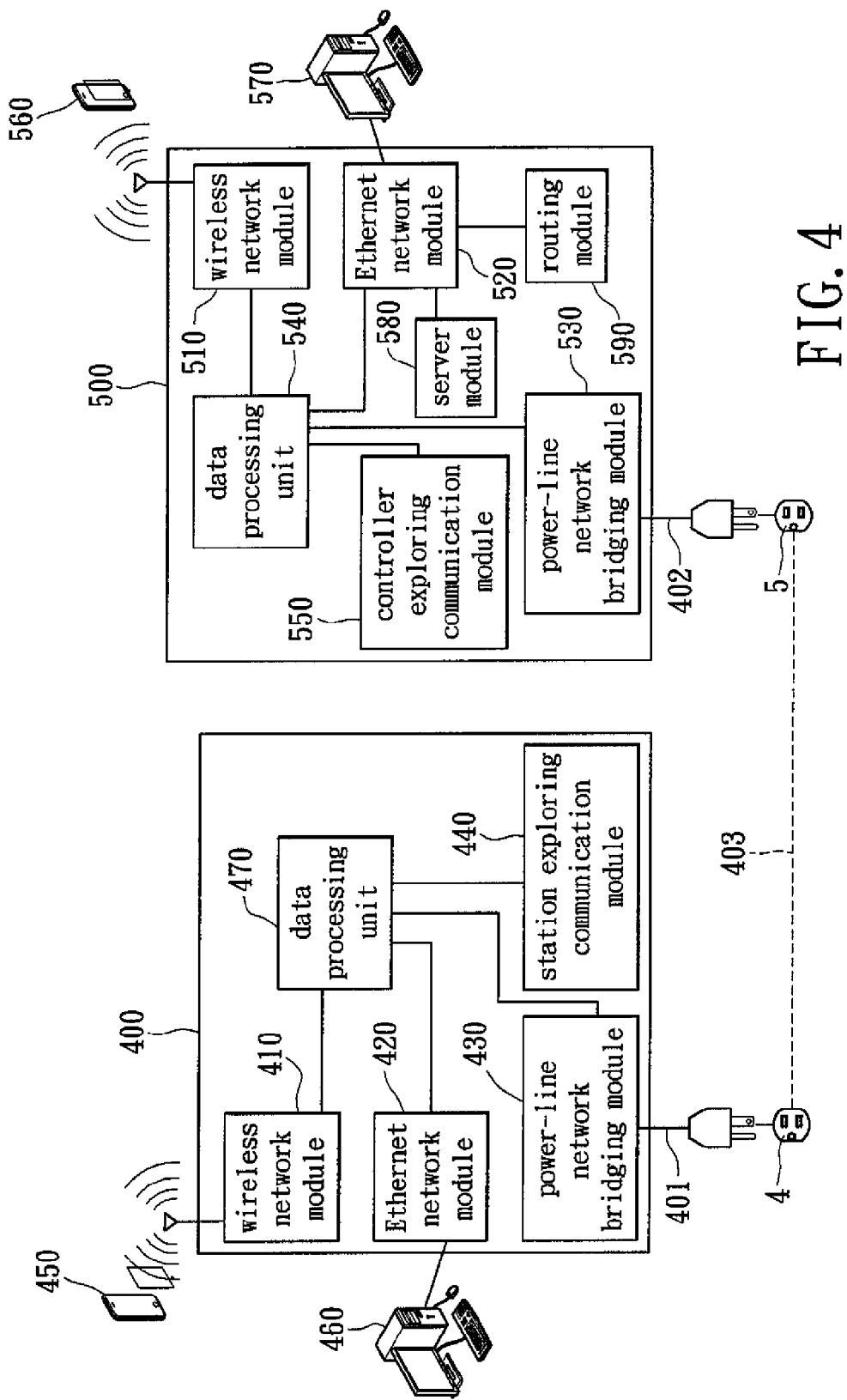
FIG. 4 depicts a connection between a wireless network extension station and the wireless Ethernet extension controller of the embodiment in accordance with the instant disclosure.

FIG. 4 schematically shows the connection between the wireless Ethernet extension controller and the wireless network extension station.

It is provided with a body 400 of the wireless network extension station. The station preferably includes a wireless network module 410 for wireless access, an Ethernet network module 420 (not requisite) for wired connection, a power-line network bridging module 430 for coupling a power source and the power-line network, a station exploring communication module 440 for exploring the controller over the network, and a data processing unit 470 for electrically connecting those modules and processing signals conversion.

The wireless network extension station preferably uses the station-end power-line network bridging module 430 to link a power source socket for taking power, and also incorporating a power-line communication technology for data transmission. The station exploring communication module 440 may automatically explore any online wireless Ethernet extension controller through the broadcasting manner of the power-line communication technology. The exploring method is to acquire the network address of the extension controller. The network address may be a MAC address or an IP address.

Further, the body 500 of the wireless Ethernet extension controller at least includes a controller-end wireless network module 510 for wireless access, an Ethernet network module 520 (not requisite) for wired connection, a power-line network bridging module 530, for coupling the power source or the power-line network, and a controller exploring communication module 550. The controller exploring communication module 550 is used to communicate with the every wireless network extension station over the network, including transmitting the wireless network configuration. The module 550 is able to explore the other network resources or any other wireless Ethernet extension controller. The controller also includes a data processing unit 540 for electrically connecting the above-mentioned modules and performing data.

The wireless Ethernet extension controller may include a server module 580 in an exemplary example. This server module 580 is provided with technologies of remote access and maintenance. For example, a network administrator may access the wireless Ethernet extension controller via a webpage interface, including the network-related configuration. The terminal device disposed around the wireless Ethernet extension controller may thereby access the external network. Furthermore, the wireless Ethernet extension controller may has a routing module 590 for forwarding the internal and external packets.

Such as the wireless Ethernet extension controller shown in FIG. 4, the controller prepares a specific network coverage. The shown terminal devices 560 and 570 at the controller's end may respectively access the external resource via wireless and wired networks. The wireless Ethernet extension controller electrically connects to the electric plug 5 for acquiring power. Also the power-line communication technology is incorporated to connecting with the wireless network extension station which is connected to the power line 401. Over this power line 403, a power-line network is established.

The wireless network extension station in one aspect may actively acquire the wireless network configuration from the wireless Ethernet extension controller, and automatically perform the configuration. Thereby the connection to the wireless Ethernet extension controller is established. Any user able to access the wireless Ethernet extension controller and one or more wireless network extension stations may therefore be within the same network domain.

When the wireless network extension station is initialized, the modules therein may perform the above-mentioned exploring, response, and transmission of the wireless network configuration. The power-line communication technology is particularly employed to connect the power-line network bridging module of the controller, and the power-line network bridging module of each station. The broadcasted packets over the power line may be used to explore and carry the wireless network configuration. The current configurable wireless network configuration often includes some parameters such as SSID (Service Set Identifier), a selection of channel, a selection of communication protocol such as Wi-Fi 802.11a/b/g, 802.11n, a selection of wireless encryption, a selection of wireless authentication, recognition of user-end MAC address (Media Access Control address). These parameters constitute the wireless network configuration stored in the memory of the wireless Ethernet extension controller. The controller waits for the station's request through its controller exploring communication module, and sends the configuration to each station in response to the request.

On the other hand, the Ethernet extension controller may automatically connect to the one or more wireless network extension stations through wired Ethernet network and the exploring process.

Thus the wireless Ethernet extension controller may extend its network coverage because of those connected extension stations. If some more wireless network extension stations are connected, they may also receive and perform the configuration to their wireless network modules after an initializing procedure and exploring the controller's network address. Therefore the stations and the controller commonly create a LAN covering the wireless network and wired Ethernet network.

Figure 5:
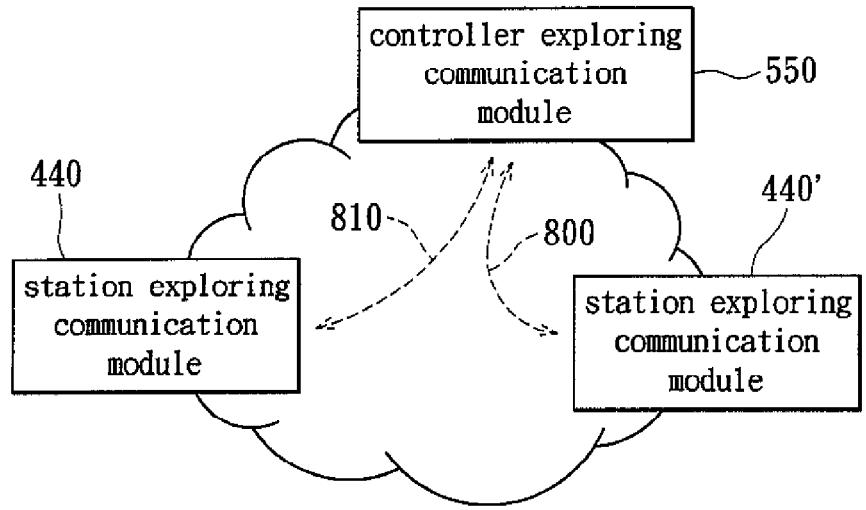
FIG. 5 depicts a connection between the exploring communication modules of the respective extension controller and station in one embodiment of the instant disclosure.

The embodiment of the exploring communication module is referred to FIG. 5.

In the current example, the wireless network extension station (400, FIG. 4) adopts a plug-and-play installation. The shown station exploring communication modules (440, 440') may automatically regard the network as a tangible medium, such as a power-line network or an Ethernet network. The power-line communication technology is particularly introduced to exploring any device over the power-line network using broadcasted packets. By which, the network address of the wireless Ethernet extension controller (500, FIG. 4) may be explored.

Once the station exploring communication module 440 or 440' receives the response packet from the controller exploring communication module 550, it is prepared to establish the communication (800 or 810) there-between as the station acquires the network address of the wireless Ethernet extension controller. Therefore the station exploring communication modules 440 or 440' may receive the wireless network configuration and respond to the inquiring of the wireless Ethernet extension controller.

Figure 6:
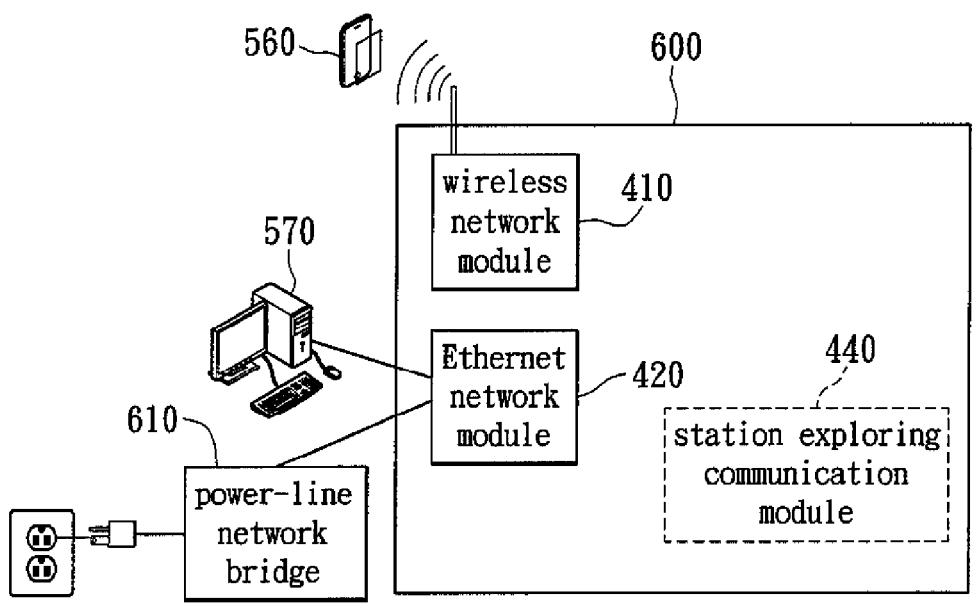
FIG. 6 is a schematic diagram describing the wireless network extension station of one further embodiment of the instant disclosure.

FIG. 6 depicts another embodiment of the wireless network extension station 600. An external power-line network bridge 610 is employed to link the power source. In comparison with the embodiment of FIG. 4, the wireless network extension station 600 incorporates the external power-line network bridge 610 in connection to the Ethernet network module 420. This aspect provides various selections of installation to users. The other operations between the wireless network module 410 and the station exploring communication module 440 may refer to the description of FIG. 4.

The power-line network bridge 610 in the exemplary example is used to employ the power-source loop to be Ethernet network as the communication medium. It is advantaged that the end user may not dispose the conventional Ethernet network but the existed power-source loop.

Figure 7:
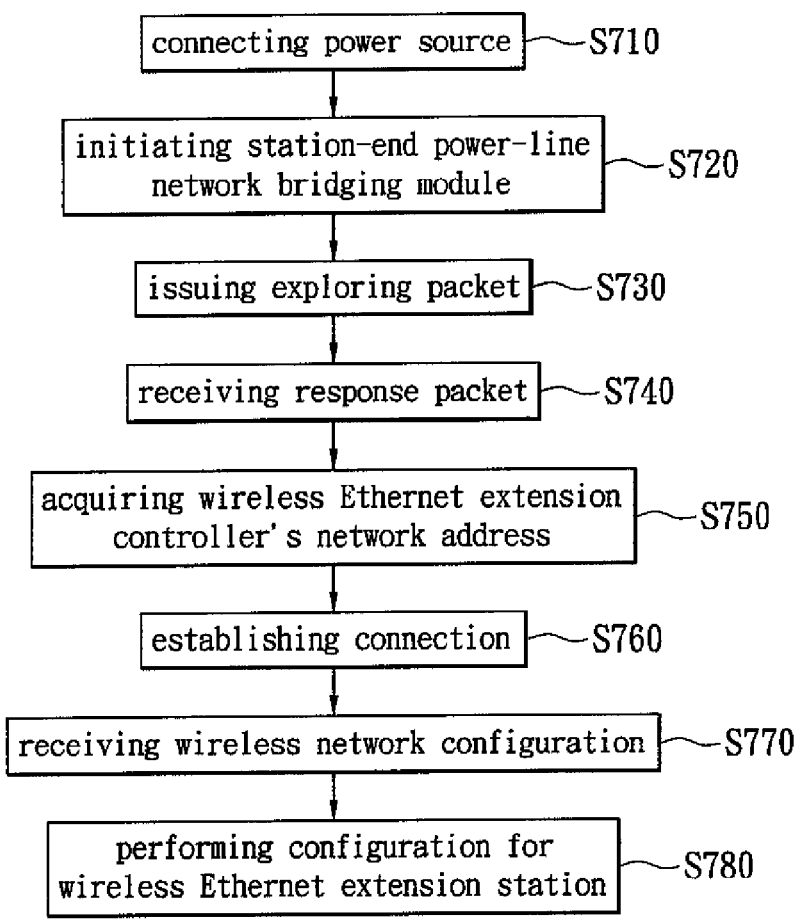
FIG. 7 a flow chart illustrating an automatic configuration method for the wireless network extension station of the embodiment of the instant disclosure.

Reference is made to FIG. 7 illustrating a flow of automatic configuration for the wireless network extension station in accordance with the instant disclosure. This wireless network extension station is able to explore the wireless Ethernet extension controller automatically within the local area network. It also achieves the plug-and-play auto connection.

In step S710, the station-end power-line network bridging module is initiated when the wireless network extension station is connected to a power source (step S720).

In the meantime, a power-line communication technology is introduced. Such as step S730, the wireless network extension station broadcasts exploring packets over the power-line network for exploring any in-progress wireless Ethernet extension controller. If any controller receives the exploring packet, a response is issued. The station then receives this response (step S740). Meanwhile, it shows an online wireless Ethernet extension controller exists within the same network, including the power-line network and the Ethernet network.

The network address of the wireless Ethernet extension controller may be retrieved from the response packet (step S750). The wireless network extension station is thereby connected with the wireless Ethernet extension controller (step S760). In accordance with the mechanism of plug-and-play of the instant disclosure, the wireless Ethernet extension controller will actively transmit the configuration to the wireless network extension station after the interconnection is established (step S770). The wireless network extension station may perform the configuration automatically by its own function. In which, the parameters related to the retrieved wireless network configuration are applied to the wireless network module of the station (step S780). Since each wireless network extension station over the same network has the identical configuration, the stations may easily connect to the network and provide broader coverage for the terminal devices without any complex setting.

Figure 8:
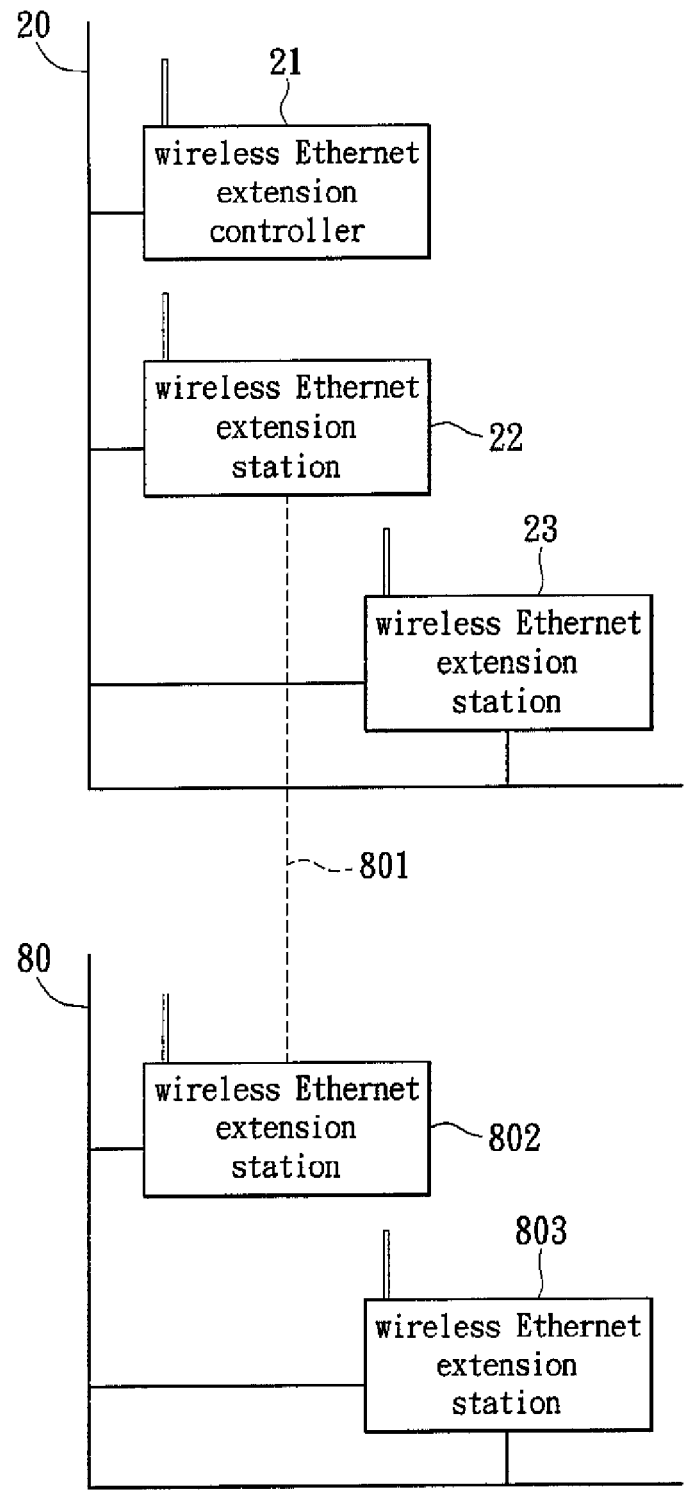
FIG. 8 illustrates a practical implement of the wireless network extension station of the embodiment of the instant disclosure.

One more embodiment is shown in FIG. 8, which exemplarily describes the network coverage made by multiple wireless network extension stations. The coverage is conducted by both wired and wireless network, and particularly by bridging another power-source loop.

For example, if any new wireless network extension station is added, the station is required to connect to the power source within the same power-source loop 20. After that, the station may actively issue the exploring packet to acquire the controller's information and network configuration. Further, when the wireless network configuration of the wireless Ethernet extension controller is modified, the controller may instantly transmit the updated configuration to the connected stations according to their addresses. The configuration to the each wireless network extension station can be updated instantly. By this aspect, the network administrator may merely update the configuration of the wireless Ethernet extension controller if any modification is applied. The other wireless network extension stations (22, 23) will follow the above described method to conduct the update.

According to the mechanism of the invention, the network coverage may be extended to the other power-source loop 80 by a bridging manner. In which, an Ethernet network line 801 is introduced to bridging two stations (22, 802) over the power-source loop. After that, the shown wireless network extension stations 802, 803 connected to the power-source loop 80 may also forward signals to the network device(s) over the power-source loop 20, for example, the wireless network extension stations 802, 803 may thereby receive the configuration from the wireless Ethernet extension controller 21. Since the stations 802, 803 perform the configuration by their own functions; the network coverage is successfully extended.

Figure 9:
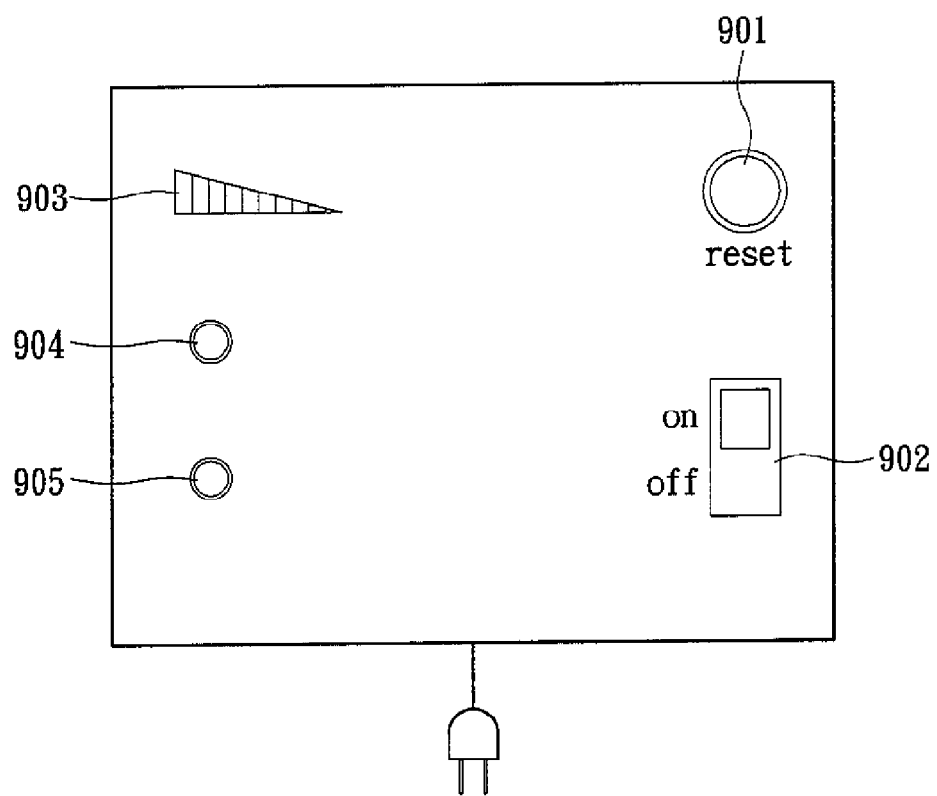
FIG. 9 shows a schematic diagram of a panel disposed with the extension station of the embodiment of the instant disclosure.

Some light indicators on the panel are exemplarily provided to indicate the operational status for the wireless network extension station. Since the panel is provided with several switches (buttons or toggle buttons) and the light indicators, the user may conveniently control and check the status of stations. Further reference is made to FIG. 9 schematically showing the outer panel of the wireless network extension station. The switches or buttons disposed on the panel 9 are provided for the user conveniently to control or check the station, such as the reset key 901 and a switch 902 for switching wireless function. Furthermore, the light indicators show the operational status of the each station. For example, a network signal intensity indicator 903 indicates the signaling quality; a connection indicator 904 indicates the status of connection to the wireless Ethernet extension controller, and a wireless network configuration indicator 905. Some descriptions are provided as follows:

The reset key 901 is used to actively update the network configuration when the user needs to check the update. While the user pushes the reset key, the station exploring communication module of station may issue a request of configuration updating. The controller may transmit the wireless network configuration to the station accordingly and automatically perform the configuration using the station's wireless network module.

The wireless network switch 902 can be used to switch off the wireless module. The user may use this switch 902 to turn off the wireless signaling function of the station since only wired network is functioned.

The network signal intensity indicator 903 indicates the status of the signals over the power-line network. The lights with different colors or luminescent spots may assist to show the intensity of signals.

The controller connection indicator 904 is used to check whether or not the network address of wireless Ethernet extension controller is found and accordingly connected with the wireless network extension station. For example, the light's colors may indicate the status of the connection to the wireless Ethernet extension controller.

The wireless network configuration indicator 905 indicates whether or not the wireless network extension station receives the wireless network configuration from the controller. For example, the light's colors may be used to show the status of the configuration.

In summation, the power-line communication technology allows the wireless network extension stations within the same network domain to issue the exploring packets as initiating. The exploring packet may be used to ensure the existence of the wireless Ethernet extension controller. The wireless Ethernet extension controller may automatically control and transmit the network configuration to each station. The wireless network extension station may automatically receive the wireless network configuration and perform the configuration by itself. Therefore, the invention achieves the function of plug-and-play. More particularly, when the wireless network configuration for the controller is modified by the administrator, the controller exploring communication module may actively connect to each station and update the configuration for each station.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A plug-and-play wireless network extension station, comprising:

a data processing unit, for processing signals among modules of the wireless network extension station;

a station wireless network module, electrically connected with the data processing unit, for providing a wireless network access service;

a station power-line network bridging module, electrically connected with the data processing unit, wherein the wireless network extension station uses the station power-line network bridging module to link an electric socket for conducting data transmission using a power-line communication technology;

a station exploring communication module, electrically connected with the data processing unit, for exploring a network address of an in-progress wireless Ethernet extension controller by broadcasting packets over the power-line communication technology automatically wherein, after initializing the wireless network extension station, the wireless network extension station automatically explores the network address of the wireless Ethernet extension controller and establishes a connection to the wireless Ethernet extension controller, and the wireless Ethernet extension controller transmits a wireless network configuration to the wireless network extension station and accomplishes the connection after automatically performing the wireless network configuration.

2. The plug-and-play wireless network extension station according to claim 1, further comprising a station Ethernet network module for providing a wired connection.

3. The plug-and-play wireless network extension station according to claim 1, wherein the connection between the wireless network extension station and the wireless Ethernet extension controller is established over an Ethernet network.

4. The plug-and-play wireless network extension station according to claim 1, wherein the power-line network bridging module is an external module electrically connected to the station Ethernet network module.

5. The plug-and-play wireless network extension station according to claim 1, wherein the wireless network extension station has an operational panel with a plurality of switches.

6. The plug-and-play wireless network extension station according to claim 5, wherein one of the switches is a reset switch for re-acquiring the wireless network configuration.

7. The plug-and-play wireless network extension station according to claim 5, wherein one of the switches is a switch which is used to deactivate the wireless network module of the wireless network extension station.

8. The plug-and-play wireless network extension station according to claim 1, wherein the wireless network extension station has an operational panel with a plurality of light indicators.

9. The plug-and-play wireless network extension station according to claim 8, wherein the light indicators are used to indicate signal intensity of the power line network.

10. The plug-and-play wireless network extension station according to claim 8, wherein the light indicators show the condition whether or not the network address of the wireless Ethernet extension controller is found.

11. The plug-and-play wireless network extension station according to claim 8, wherein the light indicators show the condition whether or not the station receives the wireless network configuration.

12. The plug-and-play wireless network extension station according to claim 1, wherein the network address is a MAC address or an IP address.

13. An automatic configuration method comprising:

linking to a power source, for connecting with a power-line network in compliance with a power-line communication technology;

initiating a power-line network bridging module;

broadcasting an exploring packet to explore a network address of a wireless Ethernet extension controller;

receiving a response and acquiring the network address, and showing an in-progress wireless Ethernet extension controller within the power-line network;

establishing a connection to the in-progress wireless Ethernet extension controller;

receiving a wireless network configuration delivered from the wireless Ethernet extension controller, and accordingly applying wireless network parameters of the wireless network configuration to the wireless network extension station; and automatically accomplishing the connection.

14. The automatic configuration method according to claim 13, wherein the network address is a MAC address or an IP address for the wireless Ethernet extension controller.

15. The automatic configuration method according to claim 13, wherein, when the wireless network configuration of the wireless Ethernet extension controller is modified, the wireless Ethernet extension controller automatically delivers the modified wireless network configuration to the one or more connected wireless network extension stations, and accomplishes the configuration.

16. The automatic configuration method according to claim 13, wherein the wireless network configuration is resent by using a reset switch.

17. The automatic configuration method according to claim 13, wherein the one or more wireless Ethernet extension stations and the in-progress wireless Ethernet extension controller are within the same local-area network.

18. The automatic configuration method according to claim 17, wherein the local-area network is the power-line network or a wired Ethernet network.

19. The automatic configuration method according to claim 17, wherein the local-area network is formed by integrating the power-line network with a wired Ethernet network.

20. The automatic configuration method according to claim 19, an Ethernet network line is introduced to bridging the two wireless network extension stations located in two different power-source loops, and the local-area network ranges over the power-line network and the wired Ethernet network.

* * * * *